(12) United States Patent
Lee et al.

(10) Patent No.: US 11,427,461 B2
(45) Date of Patent: Aug. 30, 2022

(54) LIQUID DISPENSER

(71) Applicant: LG ELECTRONICS INC., Seoul (KR)

(72) Inventors: Heejun Lee, Seoul (KR); Seungje Park, Seoul (KR); Hoyong Jang, Seoul (KR); Jeashik Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 16/573,128

(22) Filed: Sep. 17, 2019

(65) Prior Publication Data

US 2020/0115213 A1    Apr. 16, 2020

(30) Foreign Application Priority Data

Oct. 11, 2018   (KR) .......................... 10-2018-0121341

(51) Int. Cl.
*B67D 3/00* (2006.01)
*F24H 1/10* (2022.01)

(52) U.S. Cl.
CPC ......... *B67D 3/0022* (2013.01); *B67D 3/0038* (2013.01); *B67D 3/0077* (2013.01); *F24H 1/105* (2013.01); *F24H 2250/08* (2013.01)

(58) Field of Classification Search
None
See application file for complete search history.

(56) References Cited

U.S. PATENT DOCUMENTS

| | | | | |
|---|---|---|---|---|
| 941,215 A | * | 11/1909 | Wade ...................... | F24H 1/121 392/494 |
| 983,548 A | * | 2/1911 | Gale ...................... | F22B 1/284 392/401 |
| 1,387,819 A | * | 8/1921 | Werner ................... | F24H 1/106 392/321 |
| 1,617,889 A | * | 2/1927 | Woodgate ............... | F24H 1/102 392/487 |

(Continued)

FOREIGN PATENT DOCUMENTS

CN   105972813        9/2016
CN   107112307 A      8/2017

(Continued)

OTHER PUBLICATIONS

Chinese Office Action dated Oct. 9, 2021 issued in Application 201910827957.6 and English translation.

(Continued)

*Primary Examiner* — Thor S Campbell
(74) *Attorney, Agent, or Firm* — KED & Associates LLP

(57) ABSTRACT

A dispenser includes: a tank; an inlet pipe connected to the tank and to supply liquid to the tank; a heater for heating liquid in the tank; an inverter printed circuit board for controlling the operation of the heater; a heat sink formed of a metal or other heat conductive material, and having a cavity; and a power semiconductor element electrically connected to the inverter printed circuit board to control power to the heater, and fixed to the heat sink to heat-exchange with liquid flowing in the cavity. The cavity of the heat sink may receive a section of the inlet pipe or may form a flow path to receive the fluid from the inlet pipe.

20 Claims, 7 Drawing Sheets

(56) References Cited

U.S. PATENT DOCUMENTS

| | | | | |
|---|---|---|---|---|
| 3,379,854 | A | * | 4/1968 | Jovis ............... H05B 3/00 219/201 |
| 3,636,308 | A | * | 1/1972 | Hatch ............... A23L 3/365 219/439 |
| 3,782,456 | A | * | 1/1974 | Gusmer ............. F28D 7/0041 165/164 |
| 3,953,923 | A | * | 5/1976 | Rygmyr ............. A47J 31/542 29/611 |
| 4,197,446 | A | * | 4/1980 | Kalmanoviz ....... F24D 17/0068 122/407 |
| 4,214,148 | A | * | 7/1980 | Fleischhauer ....... A47J 31/545 219/506 |
| 4,255,646 | A | * | 3/1981 | Dragoy ............. F17C 7/04 137/341 |
| 4,303,827 | A | * | 12/1981 | Kyles ............... A47J 31/545 219/512 |
| 4,334,141 | A | * | 6/1982 | Roller ............... A47J 31/545 219/505 |
| 4,343,988 | A | * | 8/1982 | Roller ............... A47J 31/545 165/165 |
| 4,371,777 | A | * | 2/1983 | Roller ............... H05B 3/14 219/505 |
| 4,371,778 | A | * | 2/1983 | Meixner ............. F23K 5/20 392/480 |
| 4,460,819 | A | * | 7/1984 | Eugster ............. F24H 1/142 392/467 |
| 4,814,584 | A | * | 3/1989 | Bohlender ........... H05B 3/14 219/505 |
| 4,825,042 | A | * | 4/1989 | Hauslein ........... A47J 31/545 392/467 |
| 4,855,569 | A | * | 8/1989 | Wiedemann ......... F24H 1/0081 392/471 |
| 5,325,822 | A | | 7/1994 | Fernandez |
| 5,388,178 | A | * | 2/1995 | Moon ............... D06F 33/36 392/444 |
| 5,724,478 | A | * | 3/1998 | Thweatt ............. F24H 1/142 219/535 |
| 6,327,429 | B1 | * | 12/2001 | Chan ............... F24H 1/142 392/467 |
| 6,330,395 | B1 | * | 12/2001 | Wu ............... F24H 1/14 392/484 |
| 6,442,341 | B1 | * | 8/2002 | Wu ............... A47J 31/542 392/479 |
| 6,586,710 | B2 | * | 7/2003 | Williamson ......... A47J 31/445 219/432 |
| 6,816,670 | B1 | * | 11/2004 | Renau ............... F24H 1/121 392/467 |
| 6,912,357 | B2 | * | 6/2005 | Bissonnette ......... B05B 1/24 137/341 |
| 7,190,893 | B2 | * | 3/2007 | Kuebler ............. B60S 1/488 392/485 |
| 7,760,993 | B2 | * | 7/2010 | You ............... D06F 39/008 392/494 |
| 7,801,424 | B2 | * | 9/2010 | Cheung ............. F22B 1/288 392/399 |
| 7,813,628 | B2 | * | 10/2010 | Haan ............... F22B 1/288 392/441 |
| 7,865,073 | B2 | * | 1/2011 | Von Der Luhe ...... A47J 31/542 392/480 |
| 8,358,922 | B2 | * | 1/2013 | Stickel ............. A47L 15/4285 392/491 |
| 9,494,311 | B2 | * | 11/2016 | Moughton ......... A47J 27/21066 |
| 9,516,971 | B2 | * | 12/2016 | Klein ............... F24H 1/162 |
| 10,132,525 | B2 | * | 11/2018 | Klein ............... F24H 1/102 |
| 10,641,521 | B2 | * | 5/2020 | Wedam ............. B22D 17/24 |
| 2002/0116721 | A1 | | 8/2002 | Dobes et al. |
| 2003/0188539 | A1 | * | 10/2003 | Abras ............... F24H 4/02 62/3.3 |
| 2006/0088302 | A1 | | 4/2006 | Sturm |
| 2014/0144607 | A1 | * | 5/2014 | Furukawa ........... F28F 19/00 165/84 |
| 2016/0242312 | A1 | | 8/2016 | Singh et al. |
| 2018/0166357 | A1 | * | 6/2018 | Maehler ............. F28F 13/00 |
| 2018/0265376 | A1 | | 9/2018 | Kim |

FOREIGN PATENT DOCUMENTS

| | | |
|---|---|---|
| CN | 208571814 A | 9/2018 |
| KR | 20-1998-0016858 | 10/1988 |
| KR | 20-1996-0003550 | 1/1996 |
| KR | 20-1996-0012960 | 4/1996 |
| KR | 20-1996-0026365 | 7/1996 |
| KR | 20-1999-0035452 | 9/1999 |
| KR | 10-2000-0011550 | 2/2000 |
| KR | 10-2005-0103723 | 11/2005 |
| KR | 20-0465797 | 3/2013 |
| KR | 10-2018-0103597 | 9/2018 |
| WO | WO 2004/034742 | 4/2004 |
| WO | WO 2013/141438 | 9/2013 |

OTHER PUBLICATIONS

Korean Notice of Allowance dated Nov. 30, 2019 issued in KR Application No. 10-2018-0121341.

European Search Report dated Jan. 2, 2020 issued in EP Application No. 19199750.1.

Chinese Office Action dated Apr. 29, 2022 issued in CN Application No. 201910827957.6.

* cited by examiner

LIQUID DISPENSER

CROSS-REFERENCE TO RELATED APPLICATION

This application claims priority under 35 U.S.C. § 119 to Korean Application No. 10-2018-0121341 filed on Oct. 11, 2018, whose entire disclosure is hereby incorporated by reference.

BACKGROUND

1. Field

Embodiments relate to a liquid dispenser.

2. Background

A liquid dispenser may be generally classified as one of a storage tank-type dispenser or a direct-type dispenser. The storage tank-type dispenser stores purified water or other liquid in a storage tank and supplies the liquid from the storage tank when a user manipulates a discharge unit. In contrast, the direct-type dispenser does not have a storage tank and, instead, the direct-type dispenser filters raw water when the user manipulates the discharge unit and immediately supplies the filtered water to the user. By omitting the storage tank, the direct water-type dispenser may relatively compact and may save water in comparison to water storage tank-type dispenser.

The liquid dispenser may also provide liquid that is heated or cooled. For example, the liquid dispenser may be equipped with a heating and cooling system. The heating system is configured to generate heated water or other liquid by heating the liquid, and the cooling system is configured to generate chilled water by cooling the liquid.

One type of heater is an induction heater, and induction heaters have the advantage of the high energy efficiency and being able to rapidly and stably control the heating of a liquid. A power semiconductor element, such as a insulated-gate bipolar transistor (IGBT), a triode for alternating current (Triac), etc. may be used to control the power supply to induction heaters, but the power semiconductor element may have a switching loss and a conduction loss, causing heat generation in the power semiconductor element. Because the power semiconductor element may be destroyed when the generated heat exceeds an accepted operating temperature for the power semiconductor element, heating of the power semiconductor element may be controlled. Typically, a heat discharge plate may be used to lower the temperature of the power semiconductor element.

However, when a heater liquid is discharged continuously over an extended period of time, the temperatures of the power semiconductor element and the heat discharge plate may increase. When a temperature of the power semiconductor element and/or the heat discharge plate reaches a limit of an operating temperature range, the heater may be deactivated to prevent overheating, and the dispenser will be unable to form and discharge a heated liquid. As such, an improvement in the heat discharge structure of the power semiconductor element may enhance the continuous discharge capacity of hot water in the direct water-type liquid dispenser.

BRIEF DESCRIPTION OF THE DRAWINGS

The embodiments will be described in detail with reference to the following drawings in which like reference numerals refer to like elements wherein.

DETAILED DESCRIPTION

Hereinafter, description will be given in more detail of a water purifier or other type of liquid dispenser according to aspects of the present specification, with reference to the accompanying drawings. For the sake of brief description with reference to the drawings, the same or equivalent components will be provided with the same reference numbers, and description thereof will not be repeated. In addition, the structure applied to any one embodiment may be applied to another embodiment as long as the different embodiments are not structurally and functionally inconsistent. In describing the present disclosure, if a detailed explanation for a related known function or construction is considered to unnecessarily divert the gist of the present disclosure, such explanation has been omitted but would be understood by those skilled in the art. While the accompanying drawings may be used to help easily understand the technical idea of the present disclosure, it should be understood that the scope of the present disclosure is not limited by the accompanying drawings, and the scope of the present disclosure should be construed to extend to any alterations, equivalents and substitutes besides the accompanying drawings.

Figure 1:
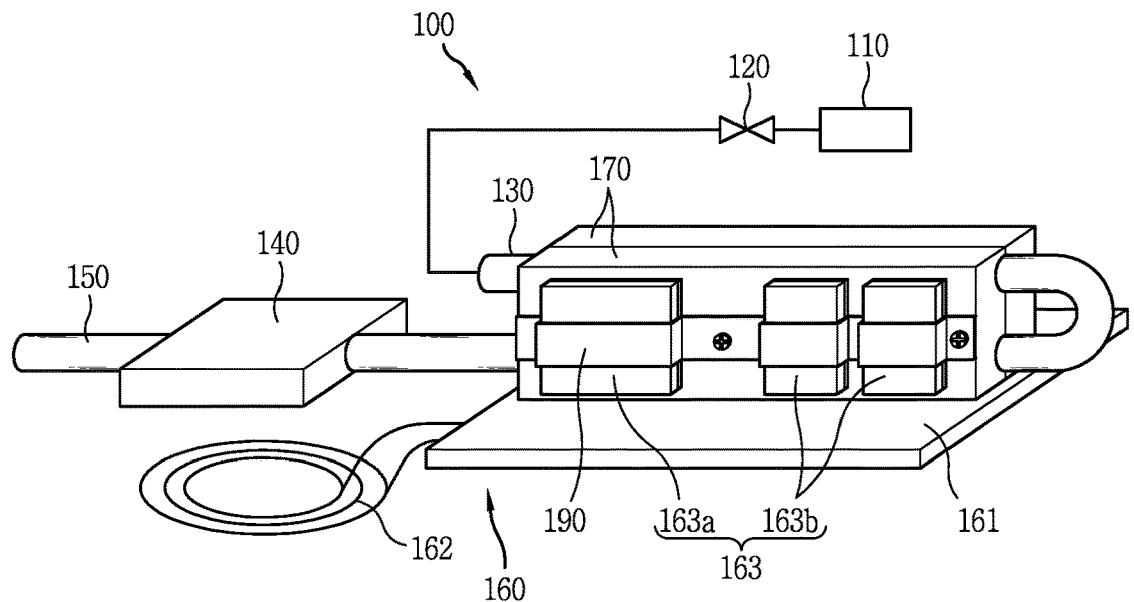
FIG. 1 is a conceptual view illustrating major elements for discharging hot water in the water purifier according to an embodiment of the present disclosure.

FIG. 1 illustrates a water purifier 100 according to an embodiment of the present disclosure. As shown in FIG. 1, the water purifier 100 may include a filter unit (or filter) 110, a flow control valve 120, an inlet pipe 130, a hot water tank 140, an outlet pipe 150, and a heating unit (or heater) 160.

The filter unit 110 is configured to purify raw water (or other liquid) provided from a water source, such as a well or a supply from a water utility. Water purified through the filter unit 110 may be drinkable by users. Purified water passing through the filter unit 110 is provided to the hot water tank 140, and then discharged to the outside of the water purifier 100 after being heated at the hot water tank 140. The flow rate of the purified water supplied to the hot water tank 140 from the filter unit 110 may be controlled by the flow control valve 120.

An inlet and an outlet may be formed in the hot water tank 140. The inlet and outlet may be placed on respective sides of the hot water tank 140. For example, FIG. 1 shows that the inlet and outlet may be placed on the left side and the right side of the hot water tank 140, respectively. However, the present disclosure is not limited to this configuration, and the location of the inlet and outlet may be varied. For example, the inlet may be formed on the upper surface of the hot water tank 140, and the outlet may be formed on the lower surface of the hot water tank 140.

An inlet pipe 130 may be connected to the inlet of the hot water tank 140, and an outlet pipe 150 may be connected to the outlet of the hot water tank 140. Purified water that has passed through the filter unit 110 may be supplied to the hot water tank 140 through the inlet pipe 130, and hot water may be discharged from the hot water tank 140 through the outlet pipe 150.

The hot water tank 140 may be formed of a conductive material. In one example, the hot water tank 140 may be formed into a rectangular body with a wide/long area and a low height. A heating flow path (not shown) may be formed inside the hot water tank 140. Water may be heated by receiving energy from the heating unit 160 while flowing through hot water tank 140. The heated flow path may have a shape that is relatively narrow and with a long width and may be densely placed inside the water tank 140. For example, the heated flow path may be to extend through sections of the water tank 140 multiple times.

The heating unit 160 is configured to heat the hot water tank 140 substantially instantaneously. In the drawings, the heating unit 160 is shown as an induction heating system that heats the hot water tank 140 using the electromagnetic induction phenomenon. For example, the heating unit 160 may include an inverter printed circuit board (PCB) 161 (or first circuitry), a heater (or heating element) 162, and a power semiconductor element 163 (or second circuitry).

The inverter printed circuit board 161 functions as a control unit or controls that controls the operation of the heater 162. For example, as described below, the inverter printed circuit board 161 may regulate a current or power supplied to the heater via the power semiconductor element 163.

The heater 162 may be connected electrically to the inverter printed circuit board 161 and may heat the hot water tank 140 using an electromagnetic induction phenomenon. The heater 162 may be composed of an induction coil. However, the present disclosure is not limited to this configuration, and the heater 162 may have various types of structures to heat the hot water tank 140, such as a surface heater.

Induction coils are formed of a conductive material, such as copper or other metal, or a conductive plastic, etc. When current is applied to the induction coil of the heater 162, a magnetic field is formed inside and around the induction coil. For example, when an alternating current (AC) is applied to the induction coil, the direction of magnetic field changes may change based on changes in the frequency of the alternating current. The induction coil is connected electrically to the inverter printed circuit board 161 to receive the alternating current.

The hot water tank 140 may be located inside the AC magnetic field of the induction coil, and a voltage may be induced to the hot water tank 140 according to the Faraday's law. When the electric current is induced in the hot water tank 140, there may be resistance in the hot water tank 140 to the flow of electrons associated with the current, and heat may be generated by this resistance.

The induced current in the hot water tank 140 may flow in an opposite direction of the current flowing through the induction coil of the heater 162. Therefore, the frequency of electric current flowing in the hot water tank 140 can be controlled by controlling the frequency of electric current flowing into the induction coil of the heater 162.

The inverter printed circuit board 161 is configured to control the current applied to the induction coil. For example, the inverter printed circuit board 161 may control the induction heating rate by varying the frequency of the current applied to the induction coil. Therefore, by adjusting the induction heating rate, water in the hot water tank 140 may be generated at a desired temperature.

The power semiconductor element 163 may be electrically connected to the inverter printed circuit board 161 to control the power supplied to the heater 162. The power semiconductor element 163 is attached to a heat sink 170, which will hereinafter be described, for discharging heat. The power semiconductor element 163 includes bridge diodes (or rectifier) 163a and an insulated gate bipolar transistor (IGBT) (or switch) 163b.

The bridge diode 163a may be connected to an alternating current (AC) power source, such as a commercial power socket. The power semiconductor element 163 may include four diodes 163a connected with each other and may function to rectify AC power into direct current (DC) power. In another example, the bridge diode 163a may be a full-wave bridge rectifier having six diodes to rectify three-phase AC power.

The IGBT 163b may be connected to the inverter printed circuit board 161 and may function as a switching device that turns on/off the power applied to the induction coil by being turned on/off by a control signal generated by the inverter printed circuit board 161. The power semiconductor element 163 may include multiple IGBTs 163b.

Heat may be generated in the power semiconductor element 163 (e.g., in the bridge diodes 163a and the IGBTs 163b) due to a switching loss and a conduction loss. As shown in the drawings, aspects of the present disclosure provide a water purifier 100 in which purified water flowing in an inlet pipe 130 is supplied to a hot water tank 140 via a heat sink 170, and a power semiconductor element 163 is fixed to an external surface of the heat sink 170 to heat-exchange with purified water flowing through the heat sink 170. In contrast to an air-cooled type heat discharge system, the water-cooled type heat discharge system may provide a more efficient cooling system that cools the heat generated by the power semiconductor element 163.

For example, since input water at a relatively cool ambient temperature may be continuously supplied through the inlet pipe 130 while hot water is discharged in the direct water-type water purifier 100, the power semiconductor element 163 can be cooled by the ambient temperature water to operate for a longer time within a desired operating temperature range. Therefore, the continuous heated water discharge capacity of the water purifier 100 can be improved.

In addition, since the input water flowing in the inlet pipe 130 is preheated by the heat exchange with the power semiconductor element 163 before being supplied to the hot water tank 140, the heating time can be reduced for hot water generation, and energy used by the heater 162 to further heat warmed water in the hot water tank 140 can be reduced in comparison to heating ambient temperature water, thereby obtaining the energy savings.

Further, a large and heavy heat discharge plate, which is used in the air-cooled heat discharge system, can be replaced with a relatively small-sized heat sink 170 since some of the heat from the power semiconductor element 163 is removed via water flowing through the inlet pipe 130. Thus, the size and weight of the water purifier 100 may be reduced in comparison to a water dispenser having an air-cooled heat discharge system.

Figure 2:
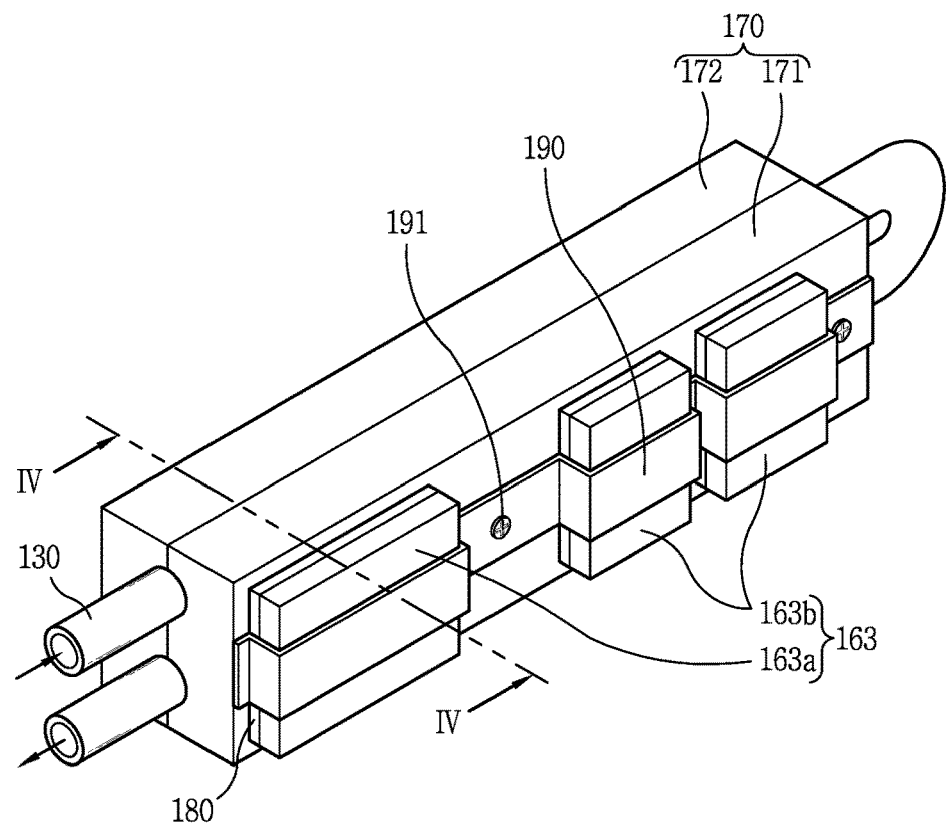
FIG. 2 is a conceptual view of heat discharge structure for a power semiconductor element of FIG. 1 according to one embodiment of the present disclosure.

Hereinafter, a specific description will be given of the water-cooled type heat discharge structure using a heat sink 170. FIG. 2 is a conceptual view of heat discharge structure for a power semiconductor element of FIG. 1 according to one embodiment of the present disclosure, FIG. 3 is an exploded view illustrating the components of FIG. 2, and FIG. 4 is a cross-sectional view taken along line "IV-IV" of FIG. 2.

Figure 3:
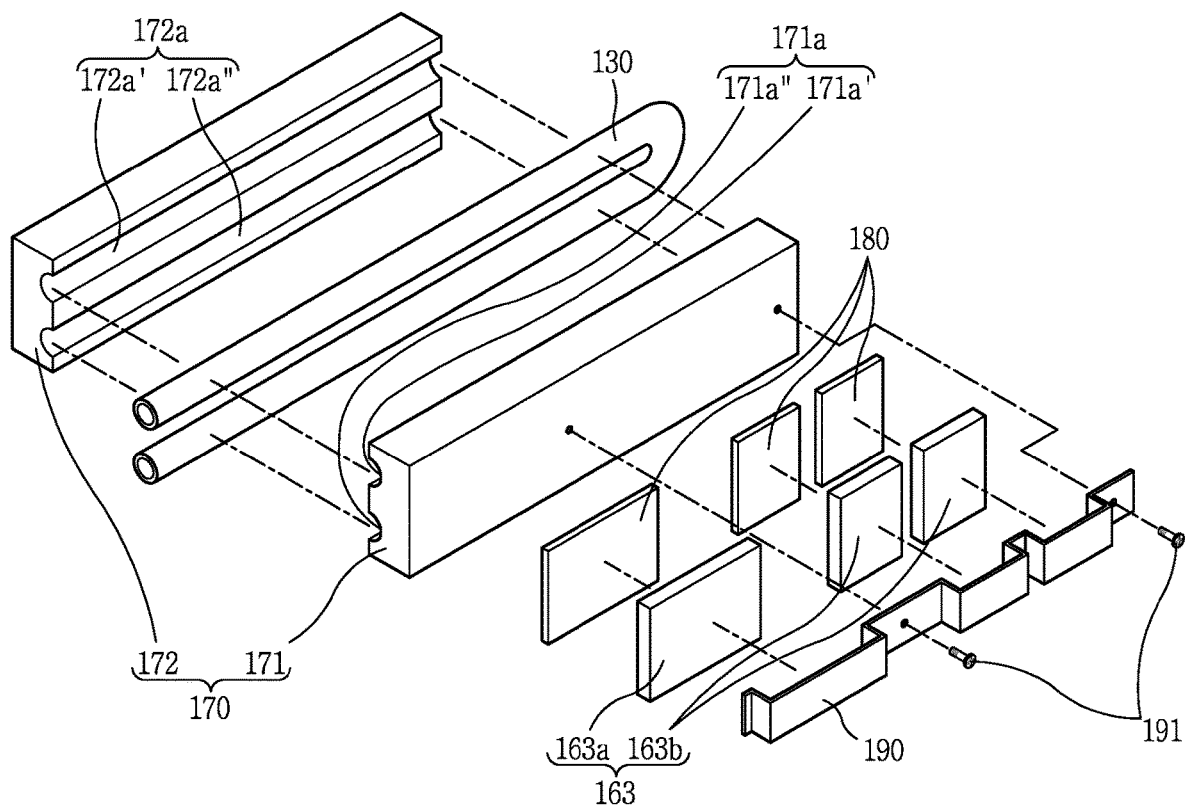
FIG. 3 is an exploded view illustrating the components of FIG. 2.
Figure 4:
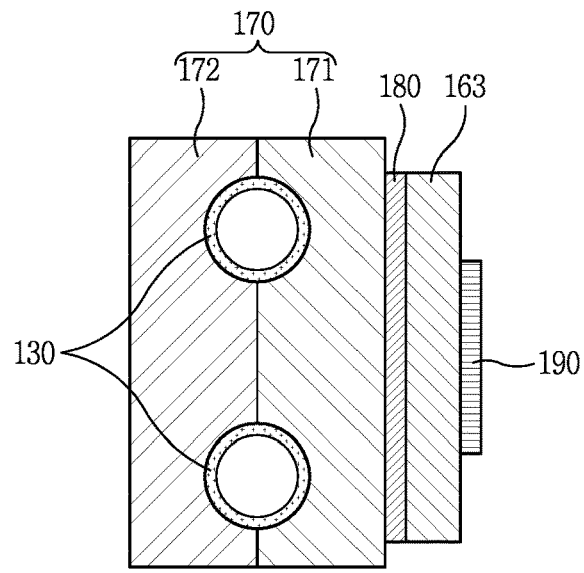
FIG. 4 is a cross-sectional view taken along line "VI-VI" of FIG. 2.

Referring to FIGS. 2 through 4, the heat sink 170 may be formed of a metal or other material with a relatively high thermal conductivity (e.g., more than 0.5 W/mK), and the heat sink 170 may be positioned to partially enclose a portion of the inlet pipe 130.

The heat sink 170 may include a first heat discharge member (or first plate) 171 and a second heat discharge member (or second plate) 172. The first and second heat discharge members 171 and 172 may be coupled to each other and configured to enclose a section of the inlet pipe 130. For example, the first and second heat discharge members 171 and 172 may be shaped and positioned to come into surface contact with an external periphery corresponding to a section of the inlet pipe 130.

The first heat discharge member 171 may include a first accommodation part (or first channel) 171a having a concave shape to receive a portion of an outer periphery of the inlet pipe 130, and the second heat discharge member 172 may include a second accommodation part (or second channel) 172a having a concave shape to receive another portion of the outer periphery of the inlet pipe 130. In one example, each of the first accommodation part 171a and the second accommodation part 172a may receive half of the inlet pipe 130 corresponding to dividing an outer periphery of the inlet pipe 130 into a half (e.g., hemispheres corresponding to respective halves of the round inlet pipe 130). Therefore, the first and second accommodation parts 171a and 172 may have similar shapes and sizes. In other examples, one of the first accommodation part 171a or the second accommodation part 172a may be relatively larger to receive a larger portion of the inlet pipe 130.

Furthermore, when the first and second heat discharge members 171 and 172 are coupled together, the first accommodation part 171a and the second accommodation part 172a may be positioned to completely enclose the outer periphery of a section of the inlet pipe 130. In another example, the first and second heat discharge members 171 and 172 may be spaced apart, such as by an intermediate member or by air, such that less than all of a section or length of the inlet pipe 130 is received in the first accommodation part 171a and the second accommodation part 172a.

In order to improve the heat discharge performance, the heat sink 170 and the inlet pipe 130 may have a structure to increase an area of a section of the inlet pipe 130 which is surrounded by or otherwise in thermal contact with heat sink 170. For example, the inlet pipe 130 may include or otherwise pass through one or more first extensions (or pipe segments), one or more second extensions (or pipe segments), and at least bend at one or more sides of the heat sink 170 to connect the first extensions and the second extensions. Furthermore, the first extensions and the second extensions may be positioned to intersect while extending in an opposite direction. For example, the first extensions and the second extensions may be positioned to extend substantially in parallel. In the first extensions and the second extensions, the purified water may flow through the inlet pipe 130 in respective opposite directions. For example, water may flow toward the heating tank 140 in the first extensions and may flow away from the heating tank 140 in the second extensions. While shown as having a u-shape om the drawings such that the inlet pipe 130 includes one first extension (e.g., an upper segment of the inlet pipe 130) and one second extension (e.g., a lower segment of the inlet pipe 130), it should be appreciated that the inlet pipe 130 may be shaped to have multiple ones of the first extensions and/or the second extensions. For example, the inlet pipe 130 may have a z-shape that includes two first extensions and one second extension connected by the two first extensions by two bends.

In the above configuration, the first heat discharge member 171 may include multiple first accommodation parts 171a' and 171a" to receive respective portions of the first and second extensions, and the second heat discharge member 171 may include multiple second accommodation parts 172a' and 172a" to receive respective portions of the first and second extensions. For example, first accommodation parts 171a' and second accommodation parts 172a' may receive respective portions (e.g., left and right portions) of the outer peripheries of the first extensions of the inlet pipe 130. Similarly, the second accommodation parts 171a" and second accommodation parts 172a" may receive respective portions (e.g., left and right portions) of the outer peripheries of the second extensions of the inlet pipe 130. In one example, the first accommodation parts 171a' and second accommodation parts 172a' may have similar sizes and shapes to receive halves of the first extensions, and the first accommodation parts 171a" and second accommodation parts 172a" may have similar sizes and shapes to receive halves of the second extensions.

In the above configuration, the heat sink 170 may be formed of a same material or similar material (e.g., a heterogeneous material) as the inlet pipe 130. For example, the inlet pipe 130 may be formed of a stainless steel (SUS) material that inhibits corrosion and bacteria breeding along a flow path for drinking water. The heat sink 170 may be formed of stainless steel material, but may be made of aluminum to provide a lower weight and while still providing a relatively high thermal conductivity.

Insulator 180 may be provided between the heat sink 170 and the power semiconductor element 163 to help prevent electrical conduction between the heat sink 170 and the power semiconductor element 163. Aluminum Oxide ($Al_2O_3$), commonly referred to "Alumina," may be used as the insulator 180. Alumina is an electrical insulator and electrically isolates the heat sink 170 and the power semiconductor element 163 from one another. At the same time, Alumina has a relatively high thermal conductivity (e.g., 30 W/mK) to allow heat from the power semiconductor element 163 to be transferred to the heat sink 170. Thus, positioning the insulator 180 between the heat sink 170 and the power semiconductor element 163 to prevent conduction therebetween, the electric-shock and fire hazards in the water-cooled type heat discharge system using the heat sink 170 can be minimized.

In one implementation, a bracket 190 may be used to fix the power semiconductor element 163 to the heat sink 170 in a pressurized state toward the heat sink 170. The bracket 190 may be coupled to the heat sink 170 so as to at least partially cover the power semiconductor element 163 so that the power semiconductor element 163 is fixed to the heat sink 170 in the pressurized conditions toward the heat sink 170. In one example shown in FIG. 4, a height of the bracket 190 in the vertical direction is relatively smaller than heights of the power semiconductor element 163 and the insulator 180, and the heights of the power semiconductor element 163 and the insulator 180 are relatively smaller than a height of the heat sink 170 in the vertical direction.

In one example, the bracket 190 may be formed of synthetic resin materials to deter conduction with the power semiconductor element 163. Furthermore, the bracket 190 may be coupled to the heat sink 170 either by a screw coupling or by a hook coupling. For example, a fixing member 191 may be a screw, nail bolt, or other coupling device may extend through a fixing hole of the bracket 190 to be coupled to the heat sink 170.

Figure 5:
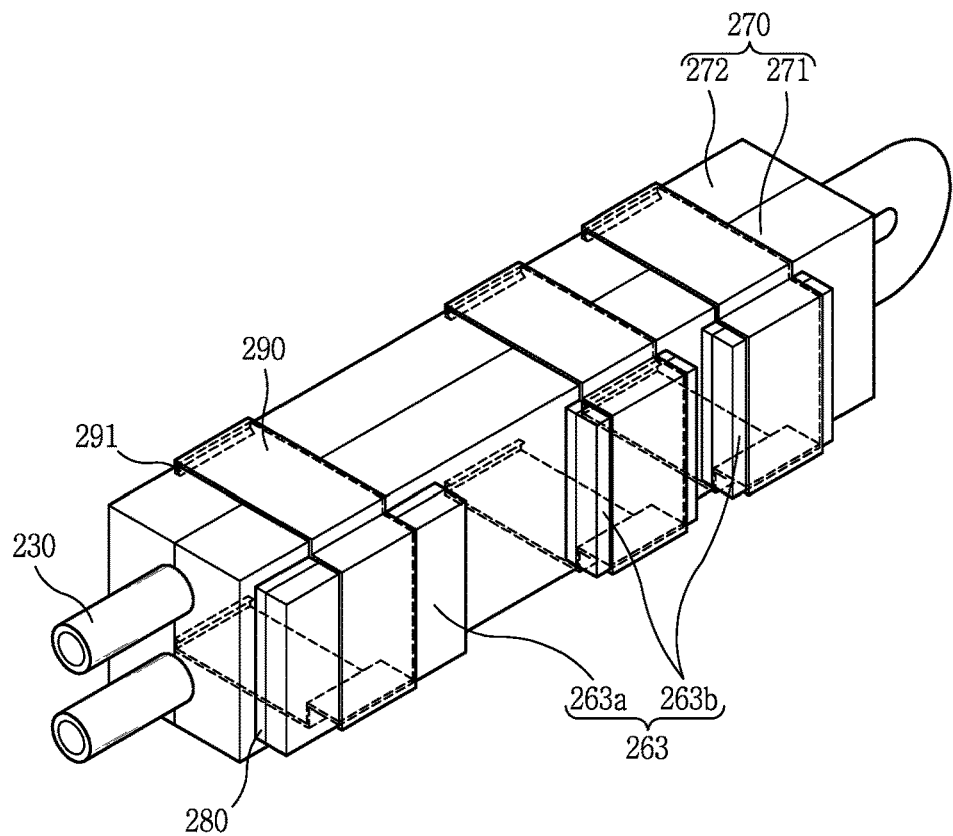
FIG. 5 is a conceptual view illustrating a modified example of the heat discharge structure for a power semiconductor element of FIG. 2.

FIG. 5 is a conceptual diagram illustrating the heat discharge structure of the power semiconductor element 163 shown in FIG. 2 according to one implementation. In FIG. 5, the bracket 290 (corresponding to bracket 190) may extend around at least a portion of the heat sink 270 to be coupled to the heat sink 270. The bracket 290 may include at least one trap hook 291, and the trap hook 291 may be coupled to the heat sink 270 in a hook coupling manner. For example, the heat sink 270 may include a hooking recess (not shown) where the trap hook 291 is received, and the trap hook 291 may engage the hooking recess. In another example, one end of the bracket 290 may include a hooking recess to receive and engage a trap hook 291 positioned on another end of the bracket 290.

Figure 6:
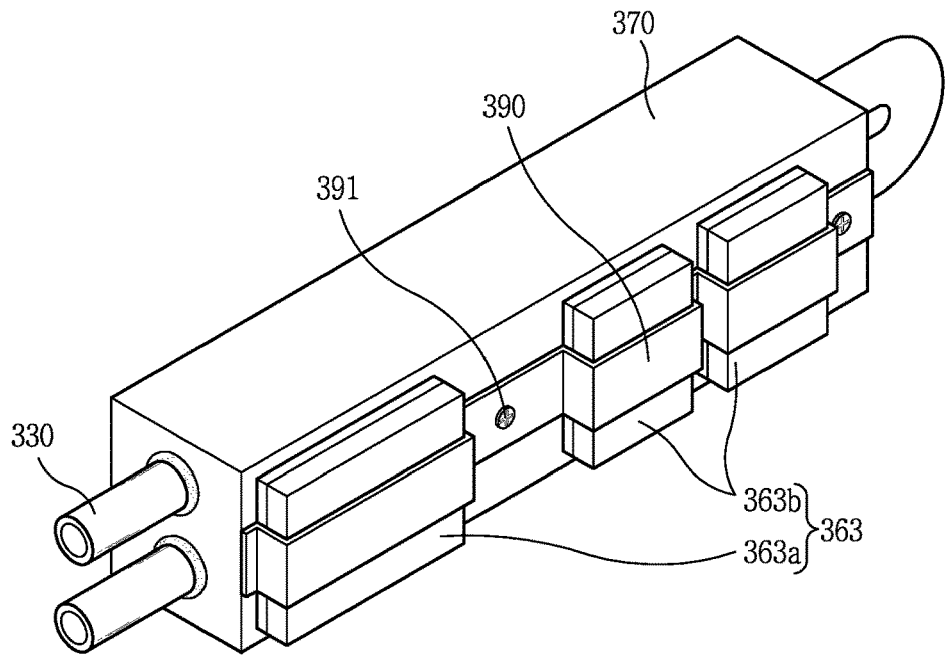
FIG. 6 is a conceptual view illustrating a second example of the heat discharge structure for a power semiconductor element of FIG. 2.
Figure 7:
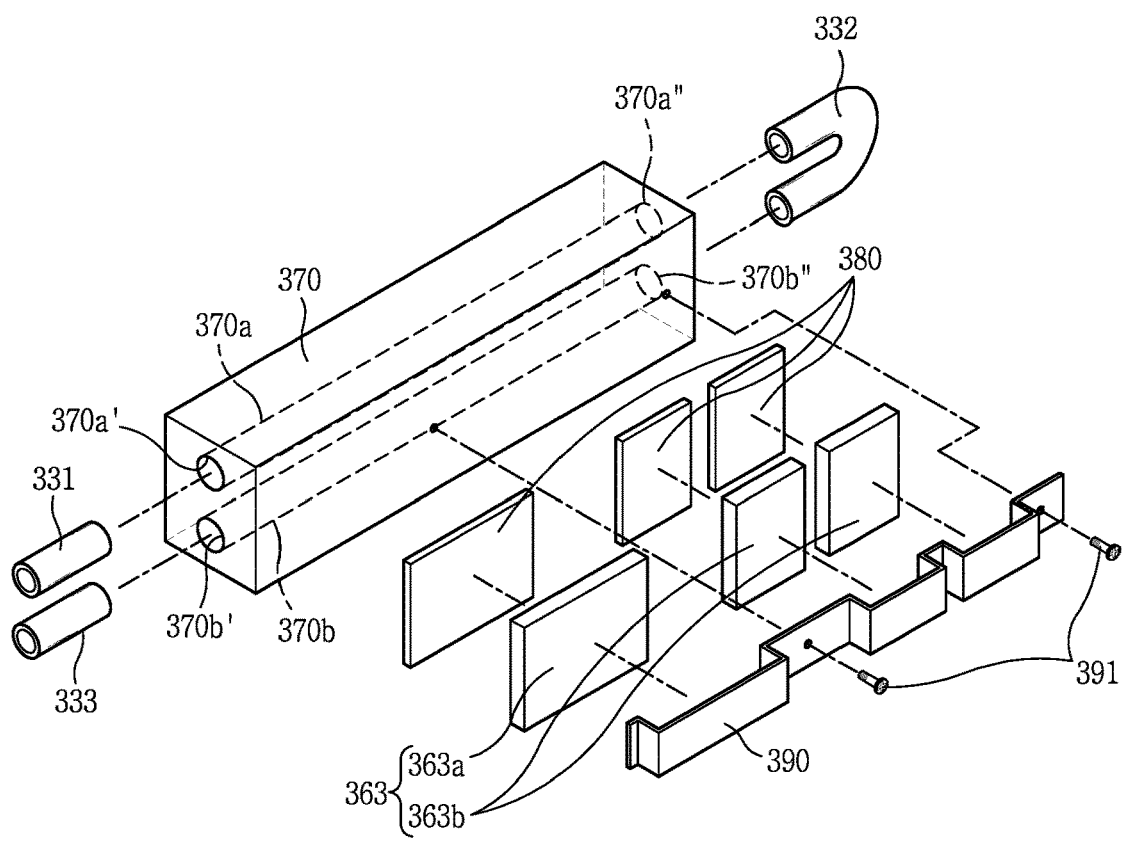
FIG. 7 is an exploded view illustrating the components of FIG. 6.

FIG. 6 is a conceptual view illustrating another example of the heat discharge structure for a power semiconductor element of FIG. 2, and FIG. 7 is an exploded view illustrating the components of FIG. 6. Referring to FIGS. 6 and 7, the heat sink 370 (corresponding to heat sink 170) may be formed in a single body and include a first inner flow path 370a and a second inner flow path 370b that extend substantially in parallel to each other. The first and second inner flow paths 370a and 370b may be formed to extend along a" length-wise direction of the heat sink 370 by an extrusion molding. For example, the first and second inner flow paths 370a and 370b are formed to be opened on both sides of the heat sink 370. The heat sink 370 may be coupled to power semiconductor element 363 (corresponding to power semiconductor element 163), and may be perform heat exchange with purified water flowing in the first and second inner flow paths 370a and 370b.

The inlet pipe 330 may be connected to the heat sink 370 and the hot water tank 340, and may be configured to supply purified water to the hot water tank 340 through the heat sink 370. The inlet pipe 330 may include a first connection part (or input segment) 331, a second connection part (or intermediate segment) 332, and a third connection part (or output segment) 333. The first connection part 331 may be connected to one end of the first inner flow path 370a. For example, the first connection part 331 may communicate with the opening 370a' of the first inner flow path 370a, which is opened at one side of the heat sink 370.

The second connection part 332 may be formed in a bent shape and may be connected to another end of the first inner flow path 370a and another end of the second inner flow path 370b. For example, the second connection part 332 may be formed as a U-shaped tube having ends that are connected to the opening 370a' of the first inner flow path 370a and the opening 370b" of the second inner flow path 370b, respectively, on a side surface of the heat sink 370.

The third connection part 333 may be connected to one end of the second inner flow path 370b. For example, the third connection part 333 may communicate with the opening of the second inner flow path 370b', on one side surface of the heat sink 370.

The first through third connection parts 331, 332 and 333 and the first and second inner flow paths may be welded together. For example, the first through third connection parts 331, 332 and 333 may be fixed to the heat sink 370 by welding.

Considering the possibility of corrosion appearing on the coupling by welding and heterogeneous welding, the inlet pipe 330 and the heat sink 370 may be formed of similar or corresponding types of metal material. For example, the first through third connection parts 331, 332 and 333 and the first and second inner flow paths 370a and 370b may be formed of stainless steel (SUS) materials that are relatively free from corrosion and germ-breeding in the sense that they form a flow path through which drinking water flows.

An insulator 380 (corresponding to insulator 180) may be positioned between the heat sink 370 and the power semiconductor element 363 to prevent conduction therebetween. Alumina ($Al_2O_3$), an aluminum oxide, may be used as the insulator 380. Alumina may electrically isolate the heat sink 370 and the power semiconductor element 363 from one another but still allows heat from the power semiconductor element 363 to be transferred to the heat sink 370 with relatively high thermal conductivity. By positioning the insulator 380 between the heat sink 370 and the power semiconductor element 363 to prevent conduction therebetween, the electric-shock and fire risk in the water-cooled type heat discharge system using the heat sink 370 can be reduced.

To fix the power semiconductor element 363 to the heat sink 370, a bracket 390 may be used. The bracket 390 may be coupled to the heat sink 370 so as to cover the power semiconductor element 363 so that the power semiconductor element 363 faces the heat sink 370 and is fixed to apply pressure to the element 363 against the heat sink 370. The bracket 390 may be formed of synthetic resin materials to prevent conduction with the power semiconductor element 363.

The bracket 390 may be coupled to the heat sink 370 either by a screw coupling or by a hook coupling, similar to the configuration shown in FIG. 5. In the example shown in FIGS. 6 and 7, the fixing member 391 may be coupled to the heat sink 370 by a screw coupling through a coupling hole 391 of the bracket 390.

Figure 8:
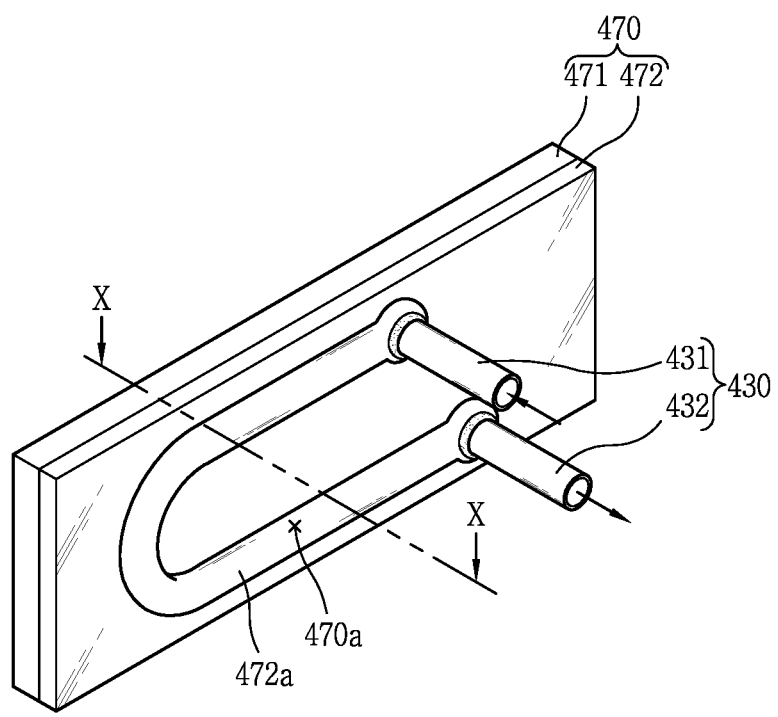
FIG. 8 is a conceptual view of heat discharge structure for a power semiconductor element of FIG. 1 according to third embodiment of the present disclosure.
Figure 9:
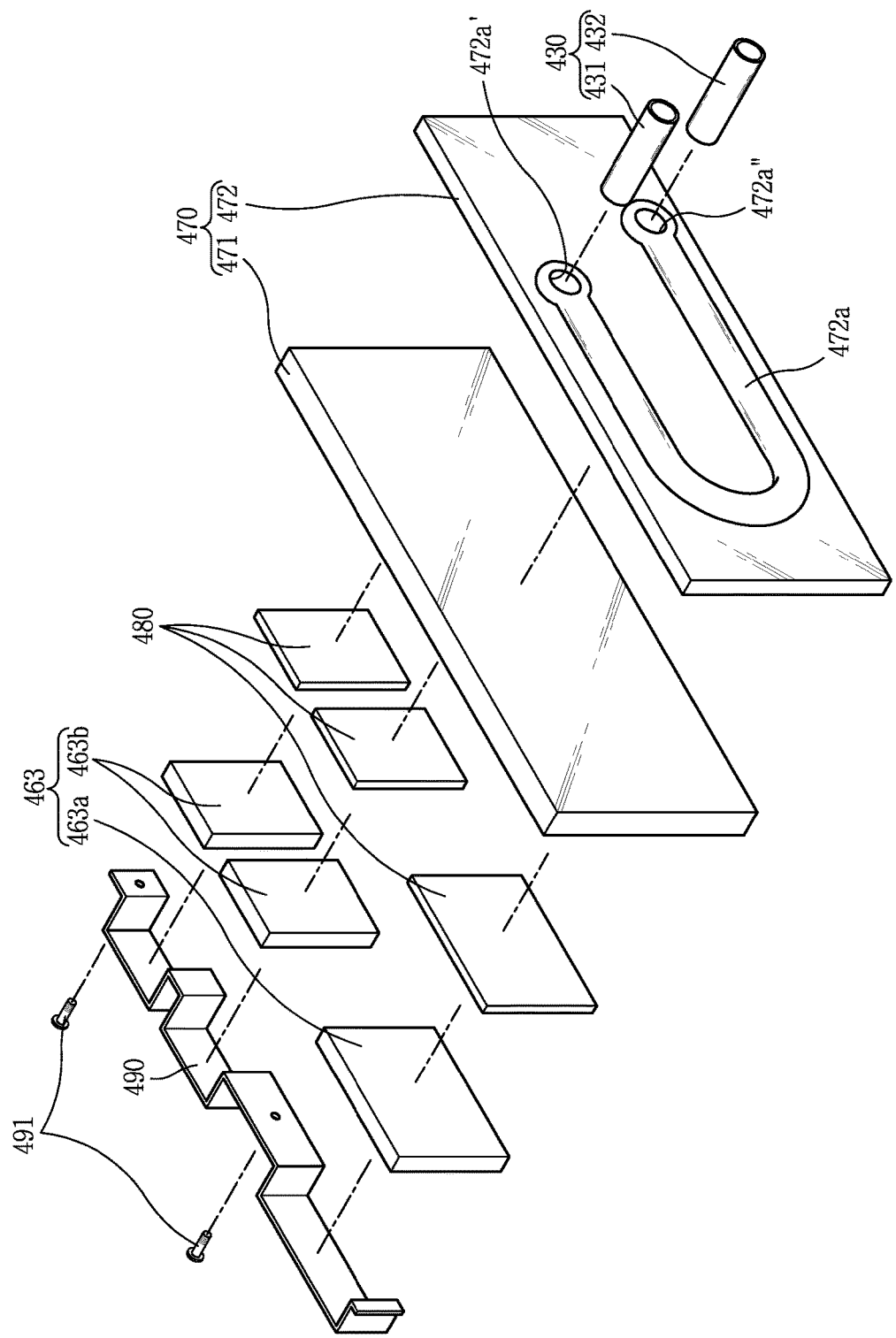
FIG. 9 is an exploded view illustrating the components of FIG. 6.
Figure 10:
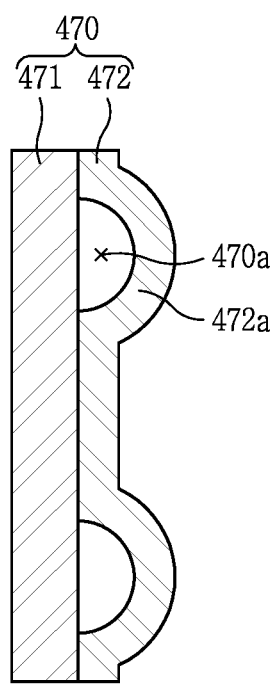
FIG. 10 is a cross-sectional view taken along line "X-X" of FIG. 8.

FIG. 8 is a conceptual view of heat discharge structure for a power semiconductor element of FIG. 1 according to third embodiment of the present disclosure, FIG. 9 is an exploded view illustrating the components of FIG. 6, and FIG. 10 is a cross-sectional view taken along line "X-X" of FIG. 8.

Referring to FIG. 8 through FIG. 10, the heat sink 470 is formed of a metal material or other material of high thermal conductivity, and may include an inner flow path 470a. The heat sink 470 may include a first frame 471 and a second frame 472, which are coupled to each other, and an inner flow path 470a may be defined by the first and second frames 471 and 472.

The first frame 471 is formed to have relatively flat surfaces at both sides. The second frame 472 may be coupled to one surface of the first frame 471, and may include a flow path forming portion 471a that forms an inner flow path 470a to protrude outwardly between one surface of the first frame 471. In the example shown in the drawing, the flow path forming portion 472a may be formed in a U-shape to increase a length of passage through the heat sink 470 to increase a heat transfer time.

The first frame 471 and the second frame 472 may be coupled together by welding. For instance, the first frame 471 and the second frame 472 may be coupled to each other by spot-welding along an outer peripheral line of the flow path forming portion 472a. In this instance, on a back surface of the second frame 472, a spot-welding line corresponding to the outer peripheral line of the flow path forming portion 472a is formed.

The second frame 472 may include an inlet port 472a' and an outlet port 472a" that communicate with the inner flow path 470a. The inlet port 472a' and the outlet port 472a" may be formed at both ends of the flow forming portion 472a, respectively. In this configuration, ends of the inner flow path 470a may include the inlet port 472a' and the outlet port 472a", respectively.

Portions of the inlet pipe 430 may be connected to both ends of the inner flow path 470a, respectively. The inlet pipe 430 may include a first connection part (or section) 431 connected to the inlet port 472a' and a second connection part (or section) 432 connected to the outlet port 472a". The second connection part 432 may be connected to the hot water tank 440 to supply purified water to the hot water tank 440.

The heat sink 470 may be coupled to the power semiconductor element 463 so as to heat-exchange with purified water flowing in the inner flow path 470a. In the drawing, it is shown that the power semiconductor element 463 is fixed to an outer surface of the first frame 471, which may be formed to be substantially flat.

The coupling between the inlet port 471a' and the first connection part (or first connection port) 431 and the coupling between the outlet port 472a" and the second connection part (or second connection port) 432 may be formed by welding. For example, the first and second connection parts 431 and 432 may be fixed to heat sink 470 (specifically, the second frame 472) by welding. Although shown in the drawings as extending in a direction substantially perpendicular to the surface of the second frame 471, it should be appreciated that the first and second connection parts 431 and 432 may extend from an end surface of the heat sink 470, similar to the first connection part 331 and the third connection part 333.

Considering the possibility of corrosion appearing on the coupling by welding and heterogeneous welding, the inlet pipe 430 (the first and second connection parts 431 and 432) and the heat sink 370 (the first and second frames 471 and 472) may be formed of corresponding kinds of metal material. The inlet pipe 430 and the heat sink 470 may be formed of stainless steel (SUS) material that may be free from corrosion and germ-breeding while forming a flow path for drinking water.

An insulator 480 may positioned between the heat sink 470 and the power semiconductor element 463 to prevent conduction therebetween. Alumina ($Al_2O_3$), an aluminum oxide, may be used as the insulator 480. Alumina electrically isolates the heat sink 470 and the power semiconductor element 463 from one another while heat from the power semiconductor element 463 can be transferred to the heat sink 470 with high thermal conductivity. By positioning the insulator 480 between the heat sink 470 and the power semiconductor element 463 to prevent conduction therebetween, the electric-shock and fire risk factors in the water-cooled type heat discharge system using the heat sink 470 can be reduced.

To fix the power semiconductor element 463 to the heat sink 470 in a pressurized state toward the heat sink 470, a bracket 490 may be used. The bracket 490 may be coupled to the heat sink 470 so as to at least partially cover the power semiconductor element 463 so that the power semiconductor element 463 faces the heat sink 470 and is fixed in the pressurized conditions. The bracket 490 may be formed of synthetic resin materials to prevent conduction with the power semiconductor element 463.

The bracket 490 may be coupled to the heat sink 470 either by a screw coupling or by a hook coupling. In one embodiment, the fixing member 491 may be coupled to the heat sink 470 by a screw coupling through a coupling hole 471 of the bracket 490.

According to an embodiment of the present disclosure, the following aspects can be obtained through the above described solutions. For example, by fixing a power semiconductor element to a heat sink and supplying purified water flowing in an inlet pipe to a hot water tank through the heat sink, the existing air-cooled heat discharge system is replaced by a water-cooled heat discharge system so that heat generated from the power semiconductor element can be efficiently cooled.

Since the ordinary temperature water may be continuously supplied through an inlet pipe while hot water is discharged, the power semiconductor element can be operated within the operating temperature range for longer periods of time due to the characteristics of the direct water type purifier. Therefore, the continuous water supply capacity of the water purifier can be improved.

In addition, purified water flowing in the inlet pipe is preheated by heat-exchanging with the power semiconductor element before the purified water flowing in the inlet pipe is supplied to the hot water tank, so the heating time can be reduced for hot water generation, and the power of the heater can be reduced, thereby reducing energy.

Secondly, a large and heavy heat discharge plate that was used in the existing air-cooled heat discharge system may be replaced by a small-sized heat sink, resulting in reducing the size and weight of the inverter printed circuit board. Thirdly, by positioning an insulator between the heat sink and the power semiconductor element to prevent conduction therebetween, the electric-shock and fire hazards in the water-cooled type heat discharge system using the heat sink can be removed.

Therefore, an aspect of the detailed description is to provide a new heat discharge structure that helps to increase a continuous discharge capacity of hot water by enhancing the heat discharge performance of power semiconductor element. Another aspect of the detailed description is to provide a new heat discharge structure that can reduce the size and weight of an inverter printed circuit board. Still another aspect of the detailed description is to provide a new heat discharge structure that can secure safety in a water leakage condition.

These and other aspects of the detailed description may be obtained by providing a water purifier in which a water-cooled type heat discharge structure substituting for conventional air-cooled type heat discharge structure by supplying purified water flowing in an inlet pipe to a hot water tank through a heat sink, and fixing the power semiconductor element to the heat sink.

According to one embodiment related to the aspect, the water purifier may include: a hot water tank; an inlet pipe connected to the hot water tank and configured to supply purified water to the hot water tank; a heater configured to heat the hot water tank; an inverter printed circuit board configured to control the operation of the heater; a heat sink formed of a metal material and disposed to partially enclose the inlet pipe; and a power semiconductor element electrically connected to the inverter printed circuit board to control power to the heater, and fixed to the heat sink to heat-exchange with purified water flowing in the inlet pipe, wherein the heat sink may include a first heat discharge member having a first accommodation part that corresponds to one outer periphery of the inlet pipe; and a second heat discharge member having a second accommodation part that corresponds to another outer periphery of the inlet pipe, and wherein the first and second accommodation parts are disposed to completely enclose the outer periphery of the inlet pipe when the first and second heat discharge members are coupled to each other.

The inlet pipe may include a first extension part and a second extension part that are bent at least one time at one side of the heat sink so as to intersect the heat sink in opposite directions from each other. Between the heat sink and the power semiconductor element, an insulator may be provided to prevent conduction between the heat sink and the power semiconductor element. The insulator may be an alumina.

The water purifier may further include a bracket that is coupled to the heat sink to cover the power semiconductor element to fix the power semiconductor element to the heat sink in a pressurized state toward the heat sink. The bracket may be formed of a synthetic resin material and coupled to the heat sink by a hook coupling or a screw coupling. The power semiconductor element may include a bridge diode and an Insulated Gate Bipolar Transistor (IGBT).

According to another embodiment, the water purifier may include: a hot water tank; a heater configured to heat the hot water tank; an inverter printed circuit board configured to control the operation of the heater; a heat sink including a first inner flow path and a second flow path that are formed of a metal single body and disposed in parallel with each other; an inlet pipe connected to the heat sink and the hot water tank and configured to supply purified water to the hot water tank via the heat sink; and a power semiconductor element electrically connected to the inverter printed circuit board to control power to the heater, and fixed to the heat sink to heat-exchange with purified water flowing in the first and second inner flow paths, wherein the inlet pipe may include a first connection part connected to one end of the first inner flow path; a second connection part formed by being bent and configured to connect the other end of the first inner flow path and the other end of the second inner flow path; and a third connection part configured to connect one end of the second flow path to the hot water tank.

The first and second inner flow paths may be formed long by an extrusion molding of the heat sink along an extended direction of the heat sink. The inlet pipe may be formed of a metal material of a same type as the heat sink and coupled to the heat sink by welding.

The water purifier may further include an insulator disposed between the heat sink and the power semiconductor element to prevent a conduction therebetween, and a bracket coupled to the heat sink to cover the power semiconductor element so as to fix the power semiconductor element to the heat sink in a pressurized state toward the heat sink.

According to still another embodiment, the water purifier may include: a hot water tank; a heater configured to heat the hot water tank; an inverter printed circuit board configured to control the operation of the heater; a heat sink formed of a metal material and including an inner flow path; an inlet pipe connected to each end of the inner flow path and the hot water tank and configured to supply purified water to the hot water tank via the heat sink; and a power semiconductor element electrically connected to the inverter printed circuit board to control power to the heater, and fixed to the heat sink to heat-exchange with purified water flowing in the inner flow path, wherein the heat sink may include a first frame having both flat surfaces; and a second frame coupled to one surface of the first frame and having a flow path forming part outwardly protruded to form an inner flow path between one surface of the first frame.

The second frame may include an inlet and an outlet both communicating with the inner flow path, and the inlet pipe may be formed of a metal material of the same type as the first and second frames and may be coupled to the inlet and outlet by welding, respectively. The power semiconductor element may be fixed to the other surface of the first frame.

The water purifier may further include: an insulator disposed between the heat sink and the power semiconductor element to prevent conduction between the heat sink and the power semiconductor element; and a bracket formed of a synthetic resin material, and coupled to the heat sink to cover the power semiconductor element so as to fix the power semiconductor element to the heat sink in a pressurized state toward the heat sink.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
   a tank;
   an inlet pipe in fluid communications with the tank to supply liquid to the tank;
   a heater to warm the tank;
   first circuitry to control power supplied to the heater;
   a heat sink having a cavity through which the liquid flows before being received at the tank; and
   second circuitry electrically connected to the first circuitry to supply power, and coupled to the heat sink to heat-exchange with the liquid flowing in the cavity of the heat sink,
   wherein a section of the inlet pipe is received in the cavity of the heat sink,
   wherein the heat sink includes:
      a first plate having a first surface with a first channel that is shaped to correspond to a first portion of an outer periphery of the section of the inlet pipe; and
      a second plate having a second surface with a second channel that is shaped to correspond to a second portion of the other outer periphery of the section of the inlet pipe,
   wherein the first surface of the first plate and the second surface of the second plate are coupled together such the first channel and the second channel form the cavity, and the outer periphery of the section of the inlet pipe is enclosed within the first channel and the second channel, and
   wherein the second circuitry is fixed to an external surface of the heat sink to heat-exchange with liquid flowing through the heat sink.

2. The liquid dispenser of claim 1, wherein the inlet pipe includes a first segment received in the heat sink, a second segment received in the heat sink, and at least one bend between the first segment and the second segment such that the liquid in the first segment flows through the heat sink in a first direction and the liquid in the second segment flows through the heat sink in second direction that is opposite to the first direction.

3. The liquid dispenser of claim 1, further comprising an insulator provided between the heat sink and the second circuitry.

4. The liquid dispenser of claim 3, wherein the insulator includes alumina or other aluminum oxide.

5. The liquid dispenser of claim 1, further comprising a bracket coupled to the heat sink and positioned to cover at least a portion of the second circuitry to fix the second circuitry to the heat sink.

6. The liquid dispenser of claim 5, wherein the bracket includes a synthetic resin material, and wherein the bracket is coupled to the heat sink by at least one of a hook formed in the bracket that is received in a portion of the heat sink or a connector that is inserted through an opening in the bracket and received in the heat sink.

7. The liquid dispenser of claim 1, wherein second circuitry includes a bridge diode rectifier and a switch.

8. The liquid dispenser of claim 7, wherein the switch is an Insulated Gate Bipolar Transistor (IGBT).

9. The liquid dispenser of claim 1, wherein the cavity forms an inner flow path that contacts the liquid when flowing through the heat sink, and
   wherein the inlet pipe includes a first section that carries the liquid into the inner flow, and a second section that carries the liquid out of the inner flow path and toward the tank.

10. The liquid dispenser of claim 9, wherein the inner flow path of the heat sink includes a first inner flow path through the heat sink that is connected to the first section of the inlet pipe, and second inner flow path through the heat sink that is connected to the second section of the inlet pipe, and
    wherein the inlet pipe further includes a third section that connects the first inner flow path and the second inner flow path and is bent such that the liquid flows in a first direction through the first inner flow path and flows in a second direction through the second inner flow path.

11. The liquid dispenser of claim 10, wherein the first and second inner flow paths are formed by extrusion molding of the heat sink along a lengthwise direction of the heat sink.

12. The liquid dispenser of claim 10, wherein the inlet pipe and the heat sink are formed of a metal material and are coupled together by welding.

13. The liquid dispenser of claim 9, wherein the heat sink includes:
    a first frame having a first surface; and
    a second frame having an surface facing the first surface of the first frame, the surface of the second frame including a first region that is coupled to the first surface of the first frame, and a second region that is outwardly protruded to form the inner flow path between the surface of the second frame and the first surface of the first frame.

14. The liquid dispenser of claim 13, wherein the second frame includes an inlet and an outlet communicating with the inner flow path, and
   wherein the inlet pipe and the second frame are formed of a metal material, the first section of the inlet pipe is welded to the inlet, and the second section of the inlet pipe is welded to the outlet.

15. The liquid dispenser of claim 13, wherein the second circuitry is fixed to a second surface of the first frame, the second surface being opposite to the first surface to face away from the second frame.

16. The liquid dispenser of claim 1, wherein the heat sink is formed of a metal material.

17. The liquid dispenser of claim 1, wherein the heater is an induction coil that generates a magnetic field to heat the tank based on the power supplied by the first and second circuitry.

18. The liquid dispenser of claim 1, further comprising a filter to purify the liquid, wherein the inlet pipe fluidly couples the filter to the tank.

19. The liquid dispenser of claim 1, wherein the heat exchange between the second circuitry and the liquid via the heat sink warms the liquid before being received in the tank.

20. A liquid dispenser, comprising:
   a tank;
   an inlet pipe in fluid communications with the tank to supply liquid to the tank;
   a heater to warm the tank;
   first circuitry to control power supplied to the heater;
   a heat sink having a cavity through which the liquid flows before being received at the tank; and
   second circuitry electrically connected to the first circuitry to supply power, and coupled to the heat sink to heat-exchange with the liquid flowing in the cavity of the heat sink,
   wherein the heater is an induction coil that generates a magnetic field to heat the tank based on the power supplied by the first and second circuitries.

\* \* \* \* \*